INVENTOR.
Jesse E. Hall, Sr.

United States Patent Office 2,864,629
Patented Dec. 16, 1958

2,864,629
THREADED COUPLING HAVING STAGGERED ROWS OF WEDGE PINS

Jesse E. Hall, Sr., Weatherford, Tex.

Application June 11, 1954, Serial No. 435,995

3 Claims. (Cl. 285—81)

This invention relates to improvements in couplings or tool joints for pipe or casing, and refers more particularly to an improved type of joint or coupling interposed in or attached to pipe or casing used in the production of subterranean fluids. The invention contemplates a locking arrangement incorporated in the skirting or flange which extends from the threaded section of the joint for a short distance axially of the pipe embracing the pipe and spaced from its exterior surface thereof.

To prevent the unscrewing of casing, pipe or tubing, or connections between float collars, casing shoes and other types of tools which are connected into or attached to pipe or casing by couplings, innumerable means have been devised including the welding of the skirting or collar extensions to the pipe. The construction herein provided aims to avoid the objections which have heretofore attended the welding of couplings or collars while furnishing a rigid unscrewable joint.

An object of the invention, therefore, is to provide a simple, inexpensive locking construction applicable to any type coupling which employs a skirting or flange adjacent the threaded portion of the connection.

Another object is to provide a positive roller wedge and race arrangement adapted to integrally lock the coupling or collar rigidly to the periphery of the pipe.

A further object is to provide a rigid unscrewable coupling or joint for connecting sections of casing or tubing or tools to a casing without materially weakening the wall structure of the pipe at or adjacent the connection.

Other and further objects and advantages will appear from the description which follows.

In the drawings which form a part of the specification and are to be read in conjunction therewith, and in which like reference numerals indicate like parts in the various views, there are shown various embodiments of the invention.

Figures 1, 2, 3, 4, 5:
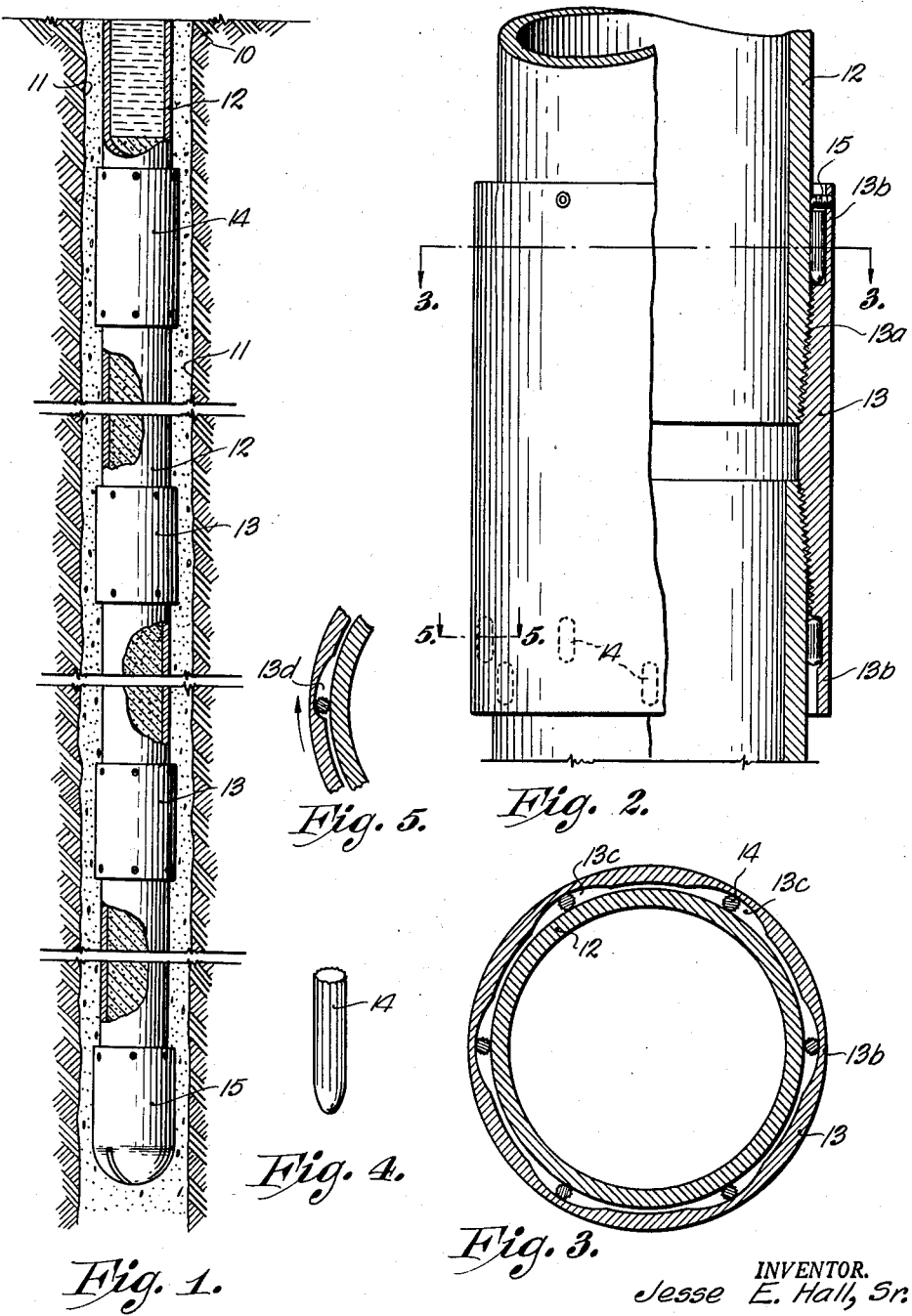
Fig. 1 shows in cross section a portion of a well bore with the casing therein equipped with couplings for the pipe sections, a float shoe and a casing shoe, all attached to the pipe by joints embodying the invention.
Fig. 2 is an enlarged detail partly in section showing the locking construction of couplings of Fig. 1 on the upper half of the collar and a modified construction on the lower half.
Fig. 3 is a view taken along the line 3—3 in Fig. 1 in the direction of the arrows.
Fig. 4 is an enlarged detail of one of the wedge pins used with the improved type of joint or coupling.
Fig. 5 is a view taken along the line 5—5 in Fig. 2.

Referring to the drawings and particularly to Fig. 1, at 10 is indicated the earth formation in which there has been drilled a well bore 11. In the well bore is a casing 12, the sections of which are connected by collars or couplings 13. At 14 is shown a float collar and at the lower end of the casing a casing shoe 15. The construction of the joint used in the collars which connect the sections of pipe, the float collar and the casing shoe is shown in detail in the upper half of Fig. 2 and in Fig. 3. The lower half of the collar shown in Fig. 2, a portion of which is cross sectioned in Fig. 5 depicts a modified construction hereinafter described.

Collar 13 is internally threaded through a portion of its central section as shown at 13a in order that it may be screwed onto the lower end of a pipe section 12 and the upper end of a connecting section of pipe also designated by the numeral 12. Extending beyond the threaded sections are flanges or skirtings 13b, whose internal diameter is somewhat larger than the outside diameter of pipe 12. These skirtings or flanges provide protection for the threads and serves as a guide for the pipe when the joint is being made up. Difficulties have been encountered in maintaining a tight joint, particularly on the lower sections of the casing since rotation of the pipe in the hole will tend to unscrew the couplings and result in an expensive, troublesome fishing job.

Many schemes have been devised to prevent the unscrewing of couplings or collars as well as the connections between tools such as float collars, casing shoes and the like. None of these have proved altogether satisfactory and operators therefore frequently resort to welding, brazing or otherwise rigidly attaching the flanges to the pipe. When the skirting or flange is welded the rim of the coupling may be weakened, as is the wall of the pipe. By forming pockets 13c circumferentially spaced upon the inside surface of the flange, and inserting wedge pins or rollers 14 in these pockets, the roughened surface of the wedge pins cooperate with the arcuate surface of the pockets and the exterior surface of the pipe to rigidly wedge the pins and prevent rotation of the collar on the pipe. The wedge pins 14 preferably have a knurled or fluted surface which increases the frictional engagement between the inner surface of the flange and the outer pipe surface. To prevent displacement or removal of the wedge pins from the pockets, holding screws 15 are screwed into threaded holes in the flange behind the pins.

In the modified construction shown in the lower half of the collar 13 in Fig. 2 and Fig. 5, the pockets are formed on the inside surface of the flange or skirting in two or more rows with the individual pockets staggered circumferentially with the pockets of the adjacent row. By this staggered arrangement the strength of the flange or skirting is retained. Also the arcuate surface of the pockets where the double row construction is used is somewhat different from that utilizing the single row. This is readily determined from comparison of the pockets shown in the cross sectional views in Fig. 2 and Fig. 5. To hold the wedge pins in place in the modified construction where a double row of pockets are employed, the wedge pins are magnetized and rotate freely with but slight frictional engagement with the pocket and pipe walls while the coupling is being screwed onto the end of the pipe section. Any tendency to unscrew will jam the wedge pins between the pipe and the arcuate surface of pockets 13d preventing unscrewing of the joint.

Thus it will be seen that there has been provided a simple, inexpensive construction whereby collars which form the joints between casing sections, pipe or tools attached thereto are easily equipped with a coupling lock which effectively prevents backing off or unscrewing of the joint or coupling after it has been made up.

From the foregoing it will be seen that this invention is one well adapted to attain all of the ends and objects hereinabove set forth, together with other advantages which are obvious and which are inherent to the invention.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In a coupling or joint of a character described, an externally threaded pipe, a matching internally threaded collar, the threaded section of said collar being spaced inwardly from one end thereof and the collar having an unthreaded bore between said end and said threaded section, a first series of pockets in said bore spaced at intervals around said pipe, a second series of pockets in said bore spaced at intervals around said pipe, the pockets of said first series being spaced axially, and staggered circumferentially, relative to those of said second series, a longitudinally disposed wedge pin in each of said pockets and each of said pockets being arcuate in transverse cross-section whereby the pin in that pocket cooperates with the arcuate surface of the pocket and with the exterior of the pipe to resist unscrewing of the collar.

2. A coupling or joint as in claim 1 wherein each of said wedge pins is longitudinally fluted.

3. In a device of the character described, a collar internally threaded throughout a portion of its length and having adjacent the threaded section an unthreaded bore, longitudinally oriented cavities in said unthreaded bore, each cavity being arcuate in transverse cross section, said cavities being arranged in two circumferential rows, the cavities of the respective rows being axially spaced and circumferentially staggered relative to one another and a magnetized wedging member in each cavity.

References Cited in the file of this patent

UNITED STATES PATENTS

| | | |
|---|---|---|
| 634,776 | Thompson | Oct. 10, 1899 |
| 959,222 | Jacobs | May 24, 1910 |
| 1,024,107 | Taylor | Apr. 23, 1912 |
| 1,669,186 | Bunker | May 8, 1928 |
| 2,005,056 | Stephens | June 18, 1935 |
| 2,318,590 | Boynton | May 11, 1943 |
| 2,623,399 | Barrett | Dec. 30, 1952 |